US007917341B2

(12) United States Patent
Sansevero et al.

(10) Patent No.: US 7,917,341 B2

(45) Date of Patent: Mar. 29, 2011

(54) ELEVATOR SYSTEM INCLUDING MULTIPLE CARS IN A HOISTWAY DESTINATION ENTRY CONTROL AND PARKING POSITIONS

(75) Inventors: Frank Sansevero, Glastonbury, CT (US); Harold Terry, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 12/624,732

(22) Filed: Nov. 24, 2009

(65) Prior Publication Data

US 2010/0070245 A1 Mar. 18, 2010

Related U.S. Application Data

(62) Division of application No. 11/568,328, filed on Oct. 26, 2006, now Pat. No. 7,650,966.

(51) Int. Cl.
*G06F 17/50* (2006.01)
*G05B 15/00* (2006.01)

(52) U.S. Cl. ............ 703/1; 187/247; 187/249; 187/281; 187/382; 187/383

(58) Field of Classification Search .................. 703/6, 7, 703/1; 187/247, 249, 281, 382, 383
See application file for complete search history.

(56) References Cited

U.S. PATENT DOCUMENTS

| | | | | |
|---|---|---|---|---|
| 849,840 | A | 4/1907 | Foster | |
| 974,439 | A | 11/1910 | Schwab | |
| 1,027,628 | A | 5/1912 | Schwab | |
| 1,805,227 | A | 5/1931 | Rugg | |
| 1,837,643 | A | 12/1931 | Anderson | |
| 1,896,776 | A | 2/1933 | James | |
| 1,896,777 | A | 2/1933 | James | |
| 5,229,559 | A * | 7/1993 | Siikonen et al. | 187/391 |
| 5,419,414 | A | 5/1995 | Sakita | |
| 5,663,538 | A | 9/1997 | Sakita | |
| 5,865,274 | A | 2/1999 | Kiji et al. | |
| 5,877,462 | A | 3/1999 | Clenais | |
| 5,969,304 | A * | 10/1999 | Barker et al. | 187/383 |

(Continued)

FOREIGN PATENT DOCUMENTS

EP 1371596 A1 12/2003

(Continued)

OTHER PUBLICATIONS

Japanese Office Action for Patent Application No. 2007-518014 dated Mar. 24, 2010 (Translation included).

(Continued)

*Primary Examiner* — Dwin M Craig

(74) *Attorney, Agent, or Firm* — Carlson, Gaskey & Olds PC

(57) ABSTRACT

An elevator system includes multiple cars within a hoistway. Parking positions are provided outside the range of passenger service levels. A destination entry strategy is used by a controller for directing movement of the elevator cars. The inventive combination of multiple cars in a hoistway, parking positions outside of the normal passenger service level range and destination entry car movement control allows for reducing car travel speed, reducing car size or both while still meeting desired handling capacity needs or even exceeding the desired handling capacity associated with another elevator system that requires larger cars, higher speeds and more building space.

7 Claims, 1 Drawing Sheet

U.S. PATENT DOCUMENTS

| | | | | |
|---|---|---|---|---|
| 6,273,217 | B1 | 8/2001 | Hikita | |
| 6,360,849 | B1 | 3/2002 | Hikita | |
| 6,364,065 | B1 | 4/2002 | Hikita | |
| 6,554,107 | B2 | 4/2003 | Yumura et al. | |
| 6,978,863 | B2 | 12/2005 | Hikita | |
| 7,032,716 | B2 | 4/2006 | Meyle et al. | |
| 7,117,979 | B2 | 10/2006 | Angst et al. | |
| 7,178,635 | B2 | 2/2007 | Meissner et al. | |
| 7,392,883 | B2 | 7/2008 | Hikita | |
| 2003/0075388 | A1 | 4/2003 | Reuter et al. | |
| 2003/0217893 | A1 * | 11/2003 | Dunser et al. | 187/249 |
| 2004/0016604 | A1 * | 1/2004 | Smith et al. | 187/281 |
| 2005/0082121 | A1 | 4/2005 | Deplazes | |
| 2005/0087402 | A1 * | 4/2005 | Haegi et al. | 187/383 |
| 2005/0279584 | A1 | 12/2005 | Ruter et al. | |
| 2006/0016640 | A1 * | 1/2006 | Duenser et al. | 187/249 |
| 2006/0289240 | A1 | 12/2006 | Sakita | |
| 2007/0039785 | A1 * | 2/2007 | Smith et al. | 187/383 |
| 2007/0045052 | A1 * | 3/2007 | Stanley et al. | 187/382 |
| 2007/0209881 | A1 * | 9/2007 | Sansevero et al. | 187/247 |

FOREIGN PATENT DOCUMENTS

| | | |
|---|---|---|
| EP | 1698580 A1 | 9/2006 |
| JP | 4345486 | 12/1992 |
| JP | 4361960 | 12/1992 |
| JP | 5051185 | 3/1993 |
| JP | 5132257 | 5/1993 |
| JP | 6305648 | 11/1994 |
| JP | 8133611 | 5/1995 |
| JP | 7157243 | 6/1995 |
| JP | 7172716 | 7/1995 |
| JP | 8133630 | 5/1996 |
| JP | 9110316 | 4/1997 |
| JP | 2001226050 | 8/2001 |
| JP | 2001240318 | 9/2001 |
| JP | 2001247265 | 9/2001 |
| JP | 2001251188 | 9/2001 |
| JP | 2001335244 | 12/2001 |
| JP | 2002087713 | 3/2002 |
| JP | 2002220164 | 8/2002 |
| JP | 2002255460 | 9/2002 |
| JP | 2003160283 | 6/2003 |
| JP | 2004155519 | 6/2004 |

OTHER PUBLICATIONS

International Search Report for International application No. PCT/US04/19818, mailed Aug. 12, 2005.

Written Opinion of the International Search Authority for International application No. PCT/US04/19818 mailed Aug. 12, 2005.

International Preliminary Report on Patentability for International application No. PCT/US2004/019818 mailed Jan. 11, 2007.

* cited by examiner

ELEVATOR SYSTEM INCLUDING MULTIPLE CARS IN A HOISTWAY DESTINATION ENTRY CONTROL AND PARKING POSITIONS

CROSS REFERENCE TO RELATED APPLICATION

This application is a divisional of U.S. patent application Ser. No. 11/568,328, which was filed on Oct. 26, 2006 now U.S. Pat. No. 7,650,966.

FIELD OF THE INVENTION

This invention generally relates to elevator systems. More particularly, this invention relates to an elevator system including multiple cars within a single hoistway.

DESCRIPTION OF THE RELATED ART

Elevator systems typically include an elevator car that travels through a hoistway between different levels within a building. While some building sizes are small enough to accommodate a hydraulic elevator arrangement, most larger buildings require a car and counterweight arrangement. For larger buildings, there have been efforts at arranging an elevator system to maximize customer service and to enhance passenger traffic flow. Conventional thinking has suggested using larger cars and higher speeds for carrying more passengers more quickly. Other proposals also have been made because there are practical limits on car size and speeds.

One technique is to use channeling or sectoring where an elevator car is assigned to service a particular grouping of floors within a building, for example. While sectoring provides increased handling capacity especially during up peak or down peak periods, there is the drawback that individualized passenger service may be compromised. For example, the time between a passenger making an elevator call and arriving at a desired destination may be longer with some sectoring arrangements under some circumstances when compared to other elevator system arrangements.

Another known technique is referred to as destination entry. With this technique, an individual provides an indication of their intended destination before entering an elevator car. This is different than conventional arrangements where a button on a car operating panel within a car allows a passenger to choose a destination floor, for example. Destination entry systems often have a main lobby device where passengers indicate their intended destinations. The elevator system uses such destination indications for assigning passengers to particular cars.

One advantage of destination entry systems is that individualized passenger service may be enhanced. The wait time between entering an intended destination and arriving at that destination can be reduced with many destination entry systems. Destination entry systems, however, typically do not accommodate up peak and down peak travel times in an efficient manner.

Another proposed enhancement to elevator systems for increasing handling capacity has been to incorporate more than one elevator car within a hoistway. This is shown for example in U.S. Pat. No. 1,837,643 and the published United States Patent Application No. US 2003/0075388. Such arrangements tend to be beneficial for inter-floor traffic and they require less building space while providing the same handling capacity of elevator systems having a single car within each hoistway. One disadvantage to such arrangements is that they typically are not well-suited for up peak and heavy two-way traffic situations. Additionally, there is no substantial cost reduction associated with such a system when compared to a traditional, single-car-per-hoistway arrangement.

One other proposed arrangement is shown in U.S. Pat. No. 5,419,414. That document discloses an arrangement where parking areas are provided above and below the normal range of elevator car operation. The parking areas facilitate using more than one car in a hoistway and allowing each car to service all possible floors.

While each of the above-described proposals present an opportunity for enhancing elevator system operation, there is still a need for better performance and lower cost systems. This invention includes a combination of elevator system-enhancing features that provides for a lower cost system that does not compromise handling capacity or system performance. The inventive combination of features provides an unexpected result that yields enhanced elevator system performance at a lower cost compared to previously proposed systems.

SUMMARY OF THE INVENTION

An exemplary disclosed elevator system includes a plurality of cars with at least two of the cars supported for movement within a single hoistway. A controller receives an intended passenger destination indication before a corresponding passenger enters one of the cars. The controller assigns at least one of the cars to travel according to the received destination indication. The controller selectively directs at least one of the two cars to a parking position outside of the range of the passenger service levels. In one example, the parking positions are at least one of beneath a lowest passenger service level or above a highest passenger service level.

In one example, the parking areas are utilized during up peak or down peak travel times. In one example, the controller selectively directs a first one of the two cars to the parking position above the highest passenger service level and the other of the two cars to the parking position below the lowest passenger service level.

An example method of designing an elevator system includes determining a desired handling capacity. Determining a traditional system design to achieve the desired handling capacity includes determining the typical number of cars, typical duty load of each of the cars and a typical travel speed of the cars. Selecting a number of cars and selecting at least one of a duty load that is less than the typical duty load or a travel speed that is lower than the typical travel speed still achieves the desired handling capacity in an elevator system designed according to this invention. In one example, the duty load and the travel speed are selected to be less than the corresponding typical parameters.

In one example, selecting more cars than a typical number and incorporating more than one car per hoistway allows for reducing the amount of building space required to accommodate the elevator system while still achieving the desired handling capacity.

The various features and advantages of this invention will become apparent to those skilled in the art from the following detailed description of currently preferred embodiments. The drawings that accompany the detailed description can be briefly described as follows.

DETAILED DESCRIPTION OF THE PREFERRED EMBODIMENT

Figure 1:
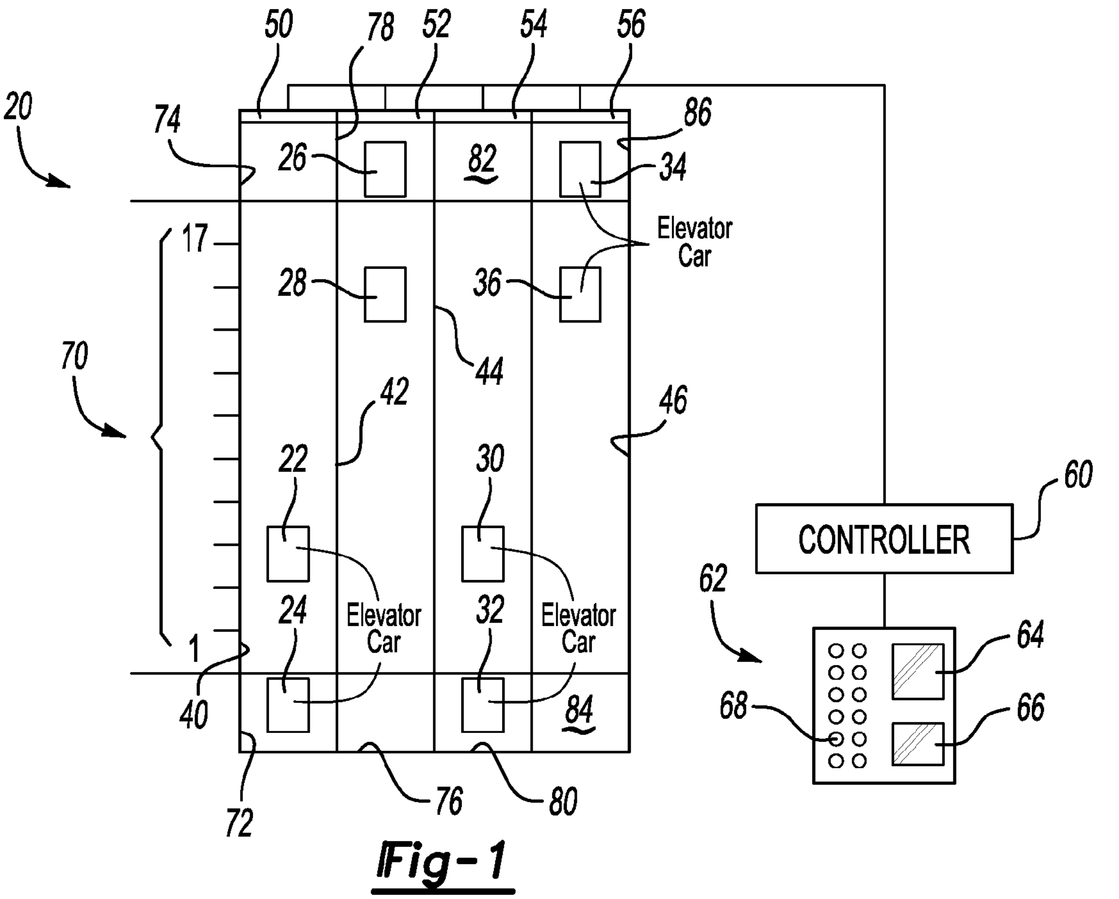
FIG. 1 schematically illustrates an elevator system designed according to one embodiment of this invention.

FIG. 1 schematically shows an elevator system 20. A plurality of elevator cars 22-36 are arranged within a plurality of hoistways such that there are at least two cars in each of the example hoistways. As can be appreciated from the figure, the elevator cars 22 and 24 are supported for movement within a first hoistway 40. The elevator cars 26 and 28 are supported for movement within a hoistway 42. Similarly, the cars 30 and 32 are supported within a hoistway 44 while the cars 34 and 36 are supported within a hoistway 46.

Elevator machines 50-56 are associated with the respective hoistways for causing desired movement of at least one selected car. In one example, a separate machine is dedicated to each car. The machines 50, 52, 54 and 56 operate responsive to control signals from a controller 60. In this example, the controller 60 operates to provide a destination entry feature where passengers provide a desired destination indication using an input device 62 that is located outside of the elevator cars. Designation entry systems are known and the example arrangement includes known techniques for providing appropriate control signals from the input device 62 to the controller 60 and ultimately for operating the machines 50-56.

The example arrangement includes display portions 64 and 66 to provide passengers with instructions for using the device 62, for example, and for providing an indication of which car will carry the passenger to their intended destination. A plurality of input buttons 68 in the illustrated example operate in a manner similar to a floor selection button on a car operating panel, which is familiar to most elevator passengers.

The example system 20 provides elevator service to passengers at a plurality of service levels 70. In this example, the service levels extend between a lobby level and a top floor level of the building in which the elevator system 20 is installed. The example arrangement also includes parking positions that are outside of the range of service levels 70 for the elevator system. The hoistway 40, for example, includes a parking position 72 beneath the lowest passenger service level and a parking position 74 above the highest passenger service level. The hoistway 42 includes parking positions 76 and 78 while the hoistway 44 includes parking positions 80 and 82. The hoistway 46 similarly includes a parking position 84 beneath the lowest passenger service level and a parking position 86 above the highest passenger service level. In the illustrated example, the parking positions accommodate a single elevator car. In another example, more than one car may be parked within a parking position under selected circumstances.

The controller 60 directs at least one of the cars to an appropriate parking position to accommodate elevator traffic requirements during up peak or down peak periods, for example. Allowing cars to go into the parking positions provides for the ability of every car within a hoistway to provide service to every floor at which passenger service is available for that hoistway. In one example, the controller 60 does not always direct a car to a corresponding parking position, but only when passenger traffic conditions indicate that to be advantageous. In that sense, the controller 60 selectively directs at least one of the cars to an appropriate parking position on an as-needed basis.

In the illustrated example, the machines 50, 52, 54 and 56 are supported within the upper parking positions 74, 78, 82 and 86, respectively. In other words, the illustrated arrangement is a machine roomless elevator system where a separate machine room is not required. In this example, the parking positions above the highest passenger service level occupy the space that would have been occupied by a machine room in another arrangement.

No one has previously combined using multiple cars within a hoistway, a destination entry strategy and parking positions for elevator cars outside of the range of the normal passenger service levels. This combination provides significant advantages compared to previous systems and an unexpected result. With this combination, optimum performance is provided for all traffic conditions including up peak and down peak travel times. Additionally, there is a significant space savings because less hoistways are required compared to arrangements where a single car is supported within each hoistway. Moreover, the inventive combination allows for significant cost savings.

One unexpected result associated with this invention is that the combination of multiple cars in a hoistway, parking positions outside of the normal passenger service level range and destination entry car control allows for actually reducing the travel speed of the cars, the duty load and size of the cars or both while still providing the same handling capacity or even enhanced handling capacity at a lower cost. This is directly contrary to conventional thinking, which suggests using larger cars and faster speeds as a means of maximizing handling capacity.

Utilizing slower speeds for the cars while still maintaining a desired handling capacity allows for cost savings because, in part, it allows for using smaller elevator machines (i.e., motors), which allows for less expensive components. Additionally, lower elevator speeds make it easier to maintain ride comfort in many situations. This allows for a less-complicated system design. Additionally, the smaller components and a more straight-forward system design reduces complexity for installation, which reduces labor time and installation expenses.

Reducing the size or duty load of the cars allows for using smaller cars and correspondingly smaller counterweights, which introduces material savings. Moreover, using smaller cars allows for utilizing smaller hoistways, which present a substantial savings in the amount of building space required for achieving a desired handling capacity. The example system 20 only requires four hoistways compared to a traditional system that would require at least six hoistways (each accommodating one car) for achieving the same handling capacity. Additionally, the four hoistways of the example system 20 can be smaller so that even less building space is required. Reducing the amount of building space occupied by an elevator system is considered an important feature to building owners where maximizing rental space results in maximizing the building owner's profitability associated with a particular building.

Figure 2:
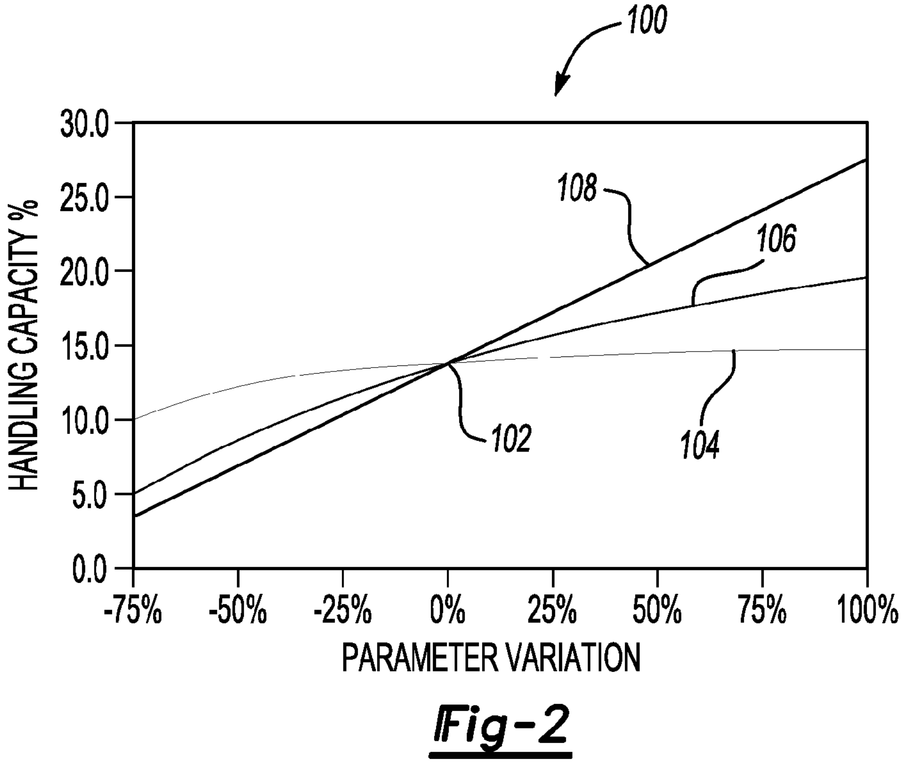
FIG. 2 graphically illustrates a relationship between elevator system parameters and handling capacity as used in an example method of designing an elevator system such as the example of FIG. 1.

FIG. 2 graphically shows the relationship between an elevator system handling capacity and different elevator system parameters. A graphical plot 100 shows system handling capacity versus elevator system design parameters. The plots shown in the graphical illustration 100 are based upon the known up peak handling capacity formula that can be expressed as UPPHC=(300*duty*0.8*number of cars)/((2*ave.HF*T1 floor transit)+((ave.stops+1)*(Tperformance−T1 floor transit))+(2*duty*0.8*(Tload+0.5*Tunload))); where duty represents the duty load of the cars, ave.HF is the average highest floor reached, T1 floor transit is the single floor flight time, ave.stops is the average number of stops made, Tperformance is the performance time, Tload is the loading time and Tunload is the unloading time.

Based upon this relationship, it can be determined that the handling capacity of an elevator system is primarily dependent upon the number of cars. This realization is new and contrary to the conventional thinking that larger cars and faster speeds provide more handling capacity.

In FIG. 2 where a 13% handling capacity is shown at 102. A traditional system design using the above formula yields a typical number of cars, a typical duty load for each car and a typical car speed to achieve the desired handling capacity. These values all coincide at 102.

A first plot 104 represents how changing the speed of the cars changes the handling capacity of the elevator system. As can be appreciated, varying the speed by 75% in a positive or negative direction does not have a substantial impact on the handling capacity of the system.

The plot 126 shows how varying the duty load (i.e., size of the car) has an impact on the handling capacity. While changing the duty load has a more significant impact than changing the car speed, the change with a 75% variation in the duty load in either direction corresponds to a change of only about 5% in the handling capacity.

The plot 108 represents the effect of the number of cars in the system on the handling capacity. The most dramatic changes in handling capacity occur when changing the number of cars. By decreasing the number of cars, for example, from the point shown at 102, the handling capacity drops more significantly than when decreasing the speed or duty load of the cars. When increasing the number or cars from the point shown at 102, the handling capacity can be substantially increased, especially compared to a similar change in the percentage of the car speed or duty load.

One feature of a method of designing an elevator system in one embodiment of this invention includes selecting at least one of a lower car travel speed or a smaller car size (i.e., lower duty ratio) compared to that which would be used in a more traditional system design to meet a particular handling capacity. In other words, one example approach for designing an elevator system begins with determining a desired handling capacity. Determining the number of cars, duty load and car travel speed required to achieve that handling capacity using a traditional elevator system design provides a baseline for then selecting system parameters to be consistent with an embodiment of this invention to achieve the same or better handling capacity in a more efficient manner. In one example, selecting a lower car speed than that which would be required in the typical system design provides cost savings as described above. In another example, selecting a smaller car size provides the advantages described above. In still another example, lower travel speed and smaller car size are combined to provide further savings and enhancement.

Increasing the number of cars overrides the effects of reducing travel speed or car size because of the more profound impact on handling capacity associated with the number of cars. Using destination entry control and incorporating multiple cars in a hoistway with parking positions so that each car can service most or all passenger service levels associated with a particular hoistway allows for reducing the car travel speed, the car duty load or both and provides a significantly enhanced elevator system performance at a lower cost.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of designing an elevator system, comprising:
- determining a desired handling capacity;
- determining a baseline system design to achieve the desired handling capacity that includes a typical number of cars, a typical duty load of each of the cars and a typical travel speed of the cars; and
- selecting a number of cars and selecting at least one of
  - a duty load for the selected number of cars that is less than the typical duty load, or
  - a travel speed that is lower than the typical travel speed, to thereby achieve the desired handling capacity.

2. The method of claim 1, including selecting a number of cars that is greater than the typical number.

3. The method of claim 2, including selecting the duty load to be less than the typical duty load and selecting the travel speed to be lower than the typical travel speed.

4. The method of claim 2, including providing a plurality of cars within a single hoistway.

5. The method of claim 4, including providing parking positions at least one of above or below a range of passenger service levels.

6. The method of claim 4, wherein the baseline system design includes a typical building space required to accommodate an associated number of typical hoistways within which the cars move and the method includes utilizing less building space than the typical building space.

7. The method of claim 1, including selecting the duty load to be less than the typical duty load and selecting the travel speed to be lower than the typical travel speed.

* * * * *